United States Patent
Prole et al.

(12) 
(10) Patent No.: US 6,362,545 B1
(45) Date of Patent: Mar. 26, 2002

(54) DYNAMOELECTRIC MACHINES HAVING ROTOR WINDINGS WITH TURBULATED COOLING PASSAGES

(75) Inventors: Aleksandar Prole, Winter Springs, FL (US); Philip L. Andrew, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/334,465

(22) Filed: Nov. 4, 1994

(51) Int. Cl.[7] .................................................. H02K 9/19
(52) U.S. Cl. .............................. 310/58; 31/68 R; 31/89; 31/61; 31/59
(58) Field of Search ............................. 310/54, 58, 59, 310/61, 52, 201, 260, 270, 64

(56) References Cited

U.S. PATENT DOCUMENTS

| | | | | |
|---|---|---|---|---|
| 1,985,040 A | | 12/1934 | Laffoon et al. | |
| 3,119,033 A | * | 1/1964 | Horsley et al. | 310/64 |
| 3,858,068 A | * | 12/1974 | Ward, Jr. | 310/59 |
| 4,059,777 A | * | 11/1977 | Whitely | 310/64 |
| 4,304,296 A | * | 12/1981 | Shaffer | 165/125 |
| 4,322,645 A | * | 3/1982 | Spirk et al. | 31/58 |
| 4,508,985 A | * | 4/1985 | Pavlik et al. | 310/55 |
| 4,602,177 A | * | 7/1986 | Eckels et al. | 310/57 |
| 4,709,177 A | | 11/1987 | Kaminski | |
| 4,900,956 A | * | 2/1990 | Gavilondo et al. | 310/61 |
| 4,922,147 A | * | 5/1990 | Sismour et al. | 310/61 |
| 5,252,880 A | * | 10/1993 | Kazmierczak et al. | 310/270 |
| 5,281,877 A | * | 1/1994 | Kazmierczak et al. | 310/59 |
| 5,491,370 A | * | 2/1996 | Schneider et al. | 310/54 |
| 5,491,371 A | * | 2/1996 | Ooi | 310/58 |

* cited by examiner

*Primary Examiner*—John Breene
(74) *Attorney, Agent, or Firm*—Nixon & Vanderhye (57) ABSTRACT

In a dynamoelectric machine, stacked turns are provided with registering openings for the flow of a cooling medium from a subslot radially within the rotor in a direction radially outwardly to cool the turns. Turbulators are provided in each of the turns to enhance the turbulent flow of the cooling medium which enhances the heat transfer between the heated turn and the cooling medium. The turbulators are formed by a coining operation after the openings are punched through the turn to form an inwardly directed rib effecting turbulent flow in that region and enhanced cooling effects.

6 Claims, 6 Drawing Sheets

Fig. 9

DYNAMOELECTRIC MACHINES HAVING ROTOR WINDINGS WITH TURBULATED COOLING PASSAGES

TECHNICAL FIELD

The present invention relates generally to rotor windings for dynamoelectric machines and particularly to improvements in the rate of heat transfer within radial ducts through stacked rotor turns to cool the windings.

BACKGROUND

As will be appreciated by those practiced in the art of dynamoelectric machine design, the capacity of current machines is constrained by physical size considerations which are to be minimized to reduce cost. Further, resistive losses within the rotor windings generate heat which must be dissipated in order to avoid electromechanical failure. This poses a serious constraint on the capacity of a machine of given physical dimension. The high thermoconductivity of gaseous hydrogen, in conjunction with diagonal flow cooling arrangements, have been successfully exploited to increase cooling capacity within the constraints of the physical size of the machine and its thermal loading. Hydrogen cooling, however, causes additional cost and complexity. It has become increasingly apparent that additional means must be provided to manage the increase in thermal loading that accompanies continuing efforts to coax additional electrical capacity from machines of a given physical dimension.

In U.S. Pat. No. 1,985,040, ducting is disclosed for flowing cooling air from the subslots of a rotor of a dynamoelectric machine to create a radial cooling flow through the ducts in direct contact with windings prior to exiting at the rotor periphery. This has become a common cooling practice, for example, see also U.S. Pat. No. 4,709,177, and it will be appreciated that this flow is turbulent in the fluid dynamic sense. The present invention extends the prior art cooling through the application of turbulators to each of the turns comprising each radial flow duct in order to enhance the mean level of turbulence and to proportionally enhance heat transfer. While turbulators have heretofore been employed to increase cooling rates within the interior flow passages of aircraft jet engine turbine blades, the application of turbulators to enhance fluid flow in the cooling system for rotors of dynamoelectric machines has not heretofore been accomplished.

DISCLOSURE OF THE INVENTION

In accordance with the present invention, a plurality of protuberances or turbulators, i.e., ribs or trips, are disposed in the radial flow cooling ducts of stacked rotor turns. The primary function of the turbulators is to increase turbulent fluid dynamic mixing between heated fluid adjacent to the duct wall and relatively cooler fluid near the duct centerline. This enhanced level of mixing brings cooler fluid in contact with the duct wall, creating greater potential for heat transfer. The turbulated ducts also increase the surface area exposed to the convective cooling gas. Areas within the ducts affording local fluid dynamic separation and reattachment for local enhancement of heat transfer are also created in the vicinity of the turbulators. The turbulators hereof are readily formed, for example, by coining the turbulators into the punched opening of each turn of the coil. The turns, of course, are stacked with radially spaced insulation strips interposed between adjacent turns. The turbulated openings through the stacked turns and the openings through the interposed insulation strips register with one another and form radial flow cooling passages or ducts extending from the rotor subslot radially outwardly to the air gap between the retaining wedges and the outermost turn and associated insulating strip. Various arrangements of the turbulators within the radial duct for optimal thermal performance may be provided, for example, by forming the turbulators along one side of the turns, alternating the turbulators on opposite sides of the duct, or forming dual turbulators on each turn within the duct.

Thus, increased rates of heat removal from the field windings of the rotor of large-capacity direct cooled electrical turbo alternators is afforded by the present invention. Additionally, rotors may be rewound or replacement rotors provided with the turbulated ducts for uprating the output or reactive capability of existing generator equipment. Importantly, no new components are introduced into the generator as a result of the enhanced cooling capacity provided by the present invention. Additionally, the present invention can be applied using any gaseous or liquid cooling medium (fluid).

Consequently, the invention enables an increase in the ampere-turn capability of turbo alternators of given physical dimension, resulting in a reduction in production costs per MW of output. Alternatively, the invention enables a reduction in the physical dimensions of machines of a given rating, which likewise results in a cost savings. Further, the invention enables a reduction of parasitic cooling flow pumping loss and windage, resulting in an improvement in overall efficiency and a reduction in perceived noise level. The invention also requires only a machining operation to extant rotor winding turns and therefore requires the addition of no new components for upgrading cooling capacity. The invention also has immediate application to a large class of dynamoelectric machines which employ the gaseous flow of air or hydrogen in direct cooling schemes, as well as to other heat transfer media, such as helium or water. Further, a particular advantage of the present invention is that it provides a completely passive heat transfer augmentation, requiring no chemical additives, acoustical input or other active stimuli. Further, the turbulators are readily manufactured through a simple single-stroke coining operation on new or existing field conductor turns or as a second stage of a progressive die punching operation. It does not require precise tolerances in order for the turbulators to perform their intended function.

In a preferred embodiment according to the present invention, there are provided rotor windings for a dynamoelectric machine comprising a plurality of stacked rotor turns, wall surfaces of each stacked rotor turn defining an opening in communication with a registering opening of an adjacent turn for flowing a fluid through the openings in communication with one another and a protuberance carried by a wall surface of at least one rotor turn projecting from the wall surface into the opening affording a turbulent flow of the fluid through the opening of the one rotor turn for positively mixing fluid in the opening adjacent the wall surface and fluid adjacent a central portion of the opening.

In a further preferred embodiment according to the present invention, there is provided a dynamoelectric machine comprising a rotor having a plurality of generally radially extending slots circumferentially spaced from one another, windings for the machine including a plurality of stacked rotor turns in each of the slots, means the stacked for introducing a cooling medium adjacent radially inner portions of rotor turn having an opening in communication with a registering opening of an adjacent turn for flowing the cooling medium from the introducing means through the registering openings in a radially outward direction, a protuberance carried by at least one rotor turn projecting into the opening affording a turbulent flow of the cooling medium through the opening of the one rotor turn for positively mixing cooling medium in the opening adjacent the wall surface and cooling medium adjacent a central portion of the opening.

In a still further preferred embodiment according to the present invention, there is provided a method of forming rotor windings for a dynamoelectric machine comprising the steps of punching a through opening in each turn of the rotor windings, coining the turn to form a protuberance in each turn projecting into the punched opening and stacking the turns in a rotor slot of the rotor of the dynamoelectric machine with the openings in registration with one another to form a flow passage.

In a still further preferred embodiment according to the present invention, there is provided a method of cooling the windings of a rotor in a dynamoelectric machine comprising the step of flowing a cooling medium generally radially outwardly through registering openings in stacked rotor turns having turbulators affording turbulent flow of the cooling medium therethrough for mixing cooling medium adjacent wall surfaces of the openings with cooling medium flowing along central portions of the openings.

Accordingly, it is a primary object of the present invention to provide enhanced cooling capacity in dynamoelectric machines affording a significant reduction in the temperature drop between the conductor turns and the cooling medium temperature for a given expenditure in parasitic cooling flow pumping loss, greater output for a given physical dimension of the machine, or alternatively a reduction in parasitic cooling flow pumping loss and windage, resulting in an increase in efficiency, a reduction in noise for a given rating and physical dimension and increased machine output for a given machine size without the added complexity of hydrogen cooling.

BEST MODE FOR CARRYING OUT THE INVENTION

Figure 1:
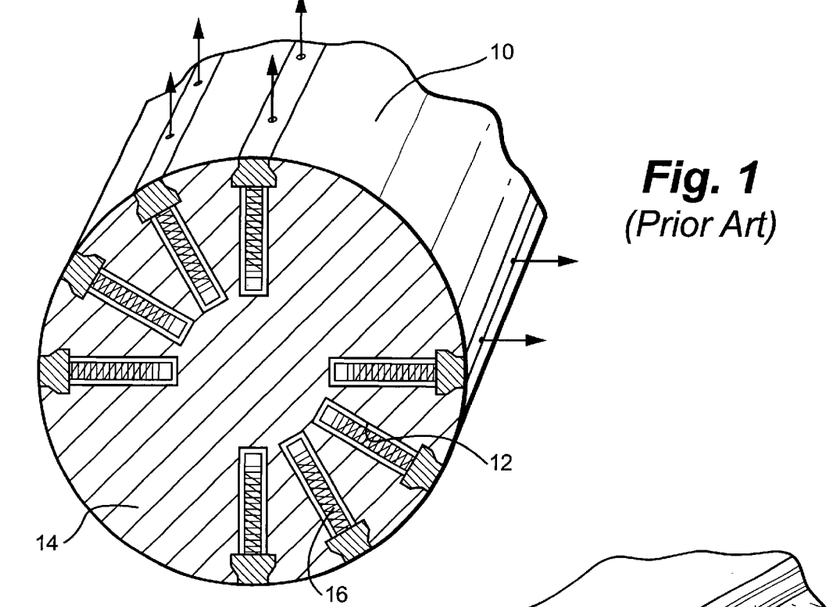
FIG. 1 is a fragmentary perspective cross-sectional view of a representative rotor assembly for use in a dynamoelectric machine.
Figure 2:
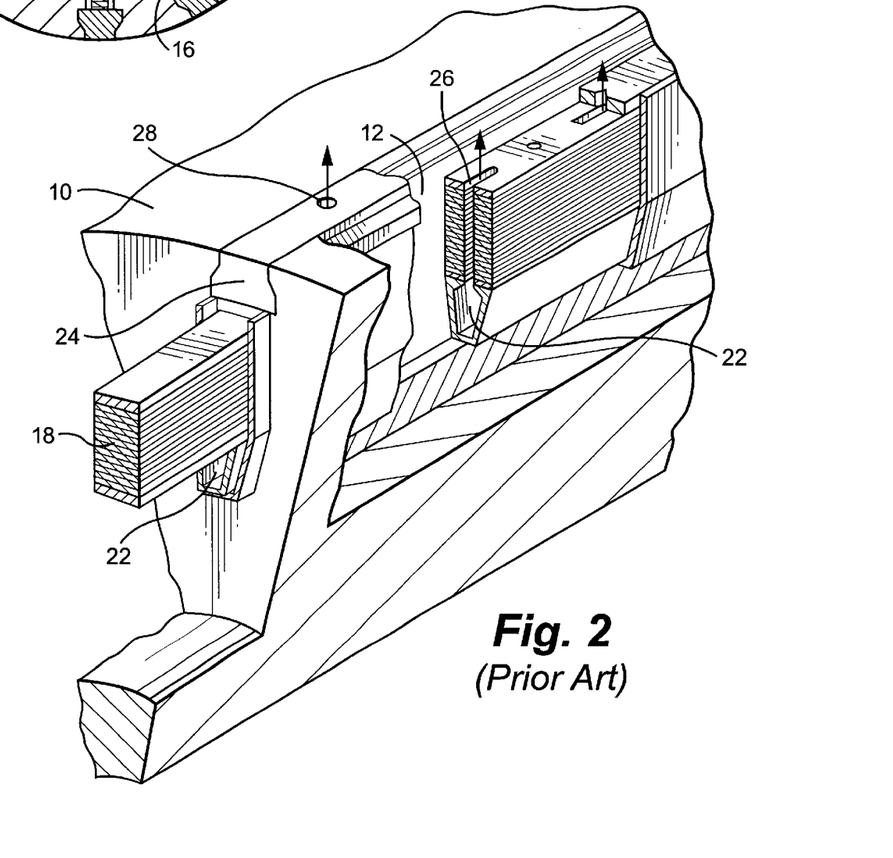
FIG. 2 is an enlarged fragmentary perspective view with portions broken out for clarity of a portion of the rotor illustrating the stacked turns and cooling passages.
Figure 3:
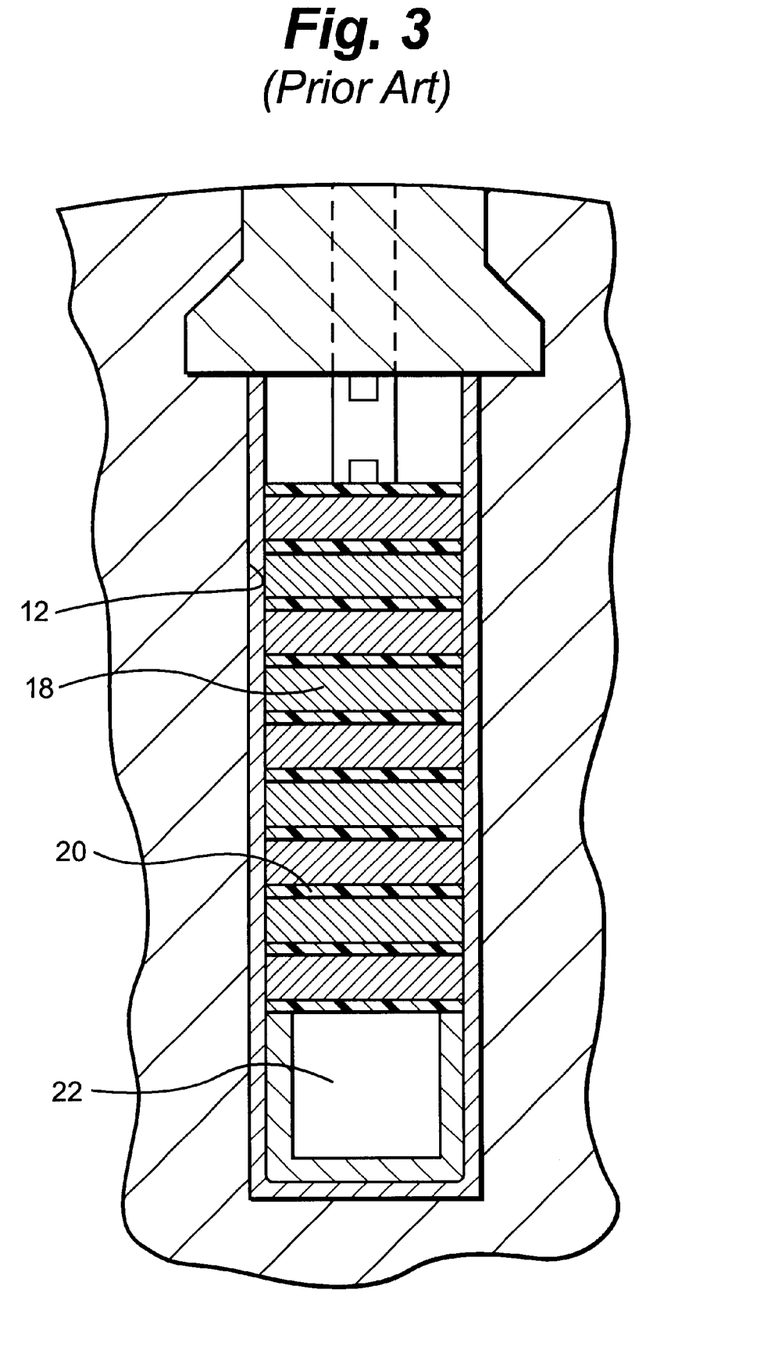
FIG. 3 is an enlarged cross-sectional view of a coil slot.

Referring now to FIGS. 1 and 2, there is illustrated a portion of a dynamoelectric machine comprised of a rotor 10 having axially extending circumferentially spaced coil slots 12 opening through the periphery of the rotor body on either side of a pole portion 14 between the slots. A rotor coil 16 comprises a plurality of stacked conductors or turns 18 (FIG. 3) having layers of insulation 20 disposed between adjacent turns 18. Below the stacked turns 18 in each slot 12 is an axially extending subslot 22 for flowing a cooling medium axially along the rotor slot 12 and for radial flow through registering openings 26 of the stacked turns 18. It will be appreciated that wedges 24 maintain the stacked turns within the rotor.

At various longitudinally spaced positions along the coil, the turns are provided with openings 26 which register with openings in adjacent turns and insulation strips whereby the cooling medium flowing through the subslot 22 flows through the registering openings and corresponding openings in the insulation 20 radially outwardly and through radial openings 28 in the wedges 24. The present invention enhances the heat transfer capability of the cooling medium flowing through the duct formed by each set of registering openings through the stacked turns and insulation strip.

Figure 4:
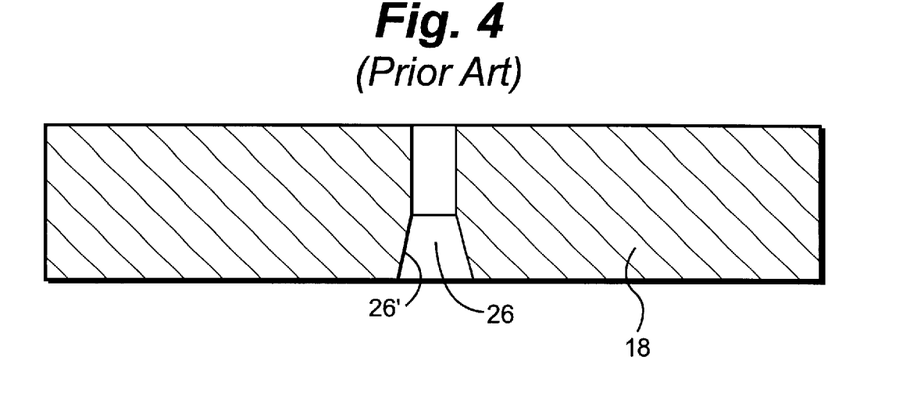
FIG. 4 is an enlarged cross-sectional view of a rotor turn according to the prior art.

Referring to FIG. 4, there is illustrated a representative example of a prior art turn 18 having an elongated cooling opening 26. The opening 26 defines a radial passage or duct through the turn for flowing a cooling medium radially outwardly as previously described. The opening 26 is typically formed by a punching operation in a radial plane. The non-uniformity of the passage width at the lower end of the opening at 26' is due to excessive clearance between the punch and the associated die which results in a break-out of material over the last portion of the conductor or turn thickness, i.e., about one-third of the turn thickness. The width of the opening 26' at the bottom of the turn 18 is therefore not an entirely controllable process.

Figure 8:
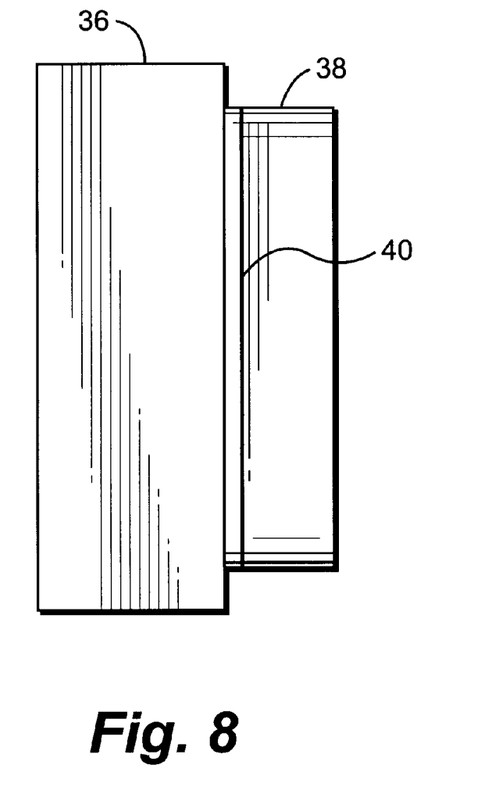
FIG. 8 is a side elevational view of a tool for forming the turbulator in the cooling passage of the turns.
Figure 9:
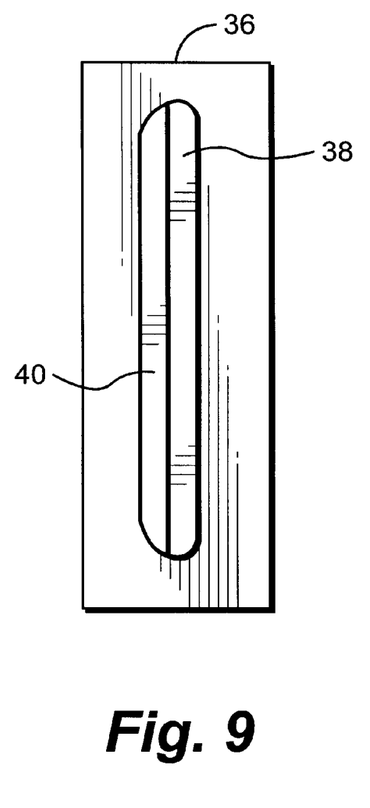
FIG. 9 is a bottom plan view of the tool illustrated in FIG. 8.
Figure 10:
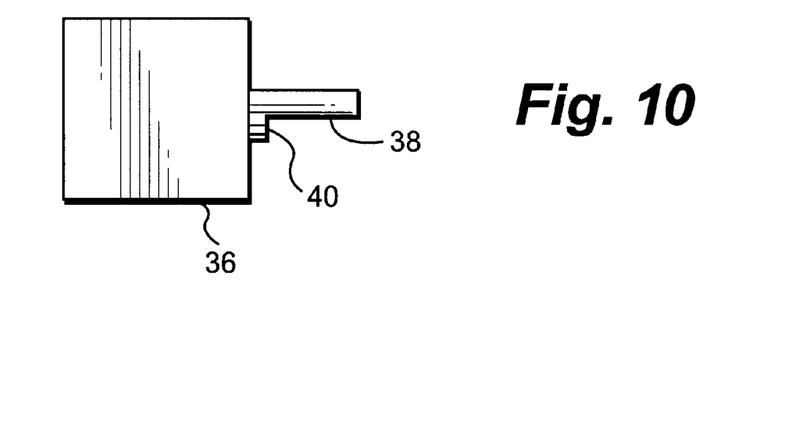
FIG. 10 is an end elevational view of the tool of FIG. 8.

The present invention specifically forms an opening to enhance turbulence of the flow of the cooling medium through the opening to increase the rate of heat transfer within the radial duct of the stacked turns to ventilate and cool the conductors more efficiently. To this end, and referring to FIG. 5, the punching operation which forms the opening 26 of the prior art may be performed as previously described. In addition, a coining operation is then performed on the opening formed through the turn 18. As will be appreciated from a review of FIG. 2, the opening 26 is elongated in the axial direction on the rotor and narrow in the circumferential direction. Preferably, the coining operation is the second stage of a two-stage progressive die following the punching operation. For example, and referring to FIGS. 8, 9 and 10, the combined punching and coining operation may be performed by a tool 36 having an elongated, generally rectilinear punch 38 projecting from the head of the tool and a step 40 projecting laterally from the base of the punch 38 adjacent the head 36. Consequently, the opening 26 may be formed by punching through each turn 18 with the step or shoulder 40 engaging an edge of the turn 18 to form a circumferentially inwardly projecting protuberance 42a (FIG. 5) having a generally arcuate undersurface 44a. The protuberance 42a as illustrated in FIG. 5 is recessed or set back from the upper or radially outer surface of each turn 18.

Consequently, the protuberance 42a constitutes an elongated protrusion extending the length of the opening 26a and projecting circumferentially inwardly toward the opposite wall 30 of opening 26a, which remains relatively smooth.

Figure 5:
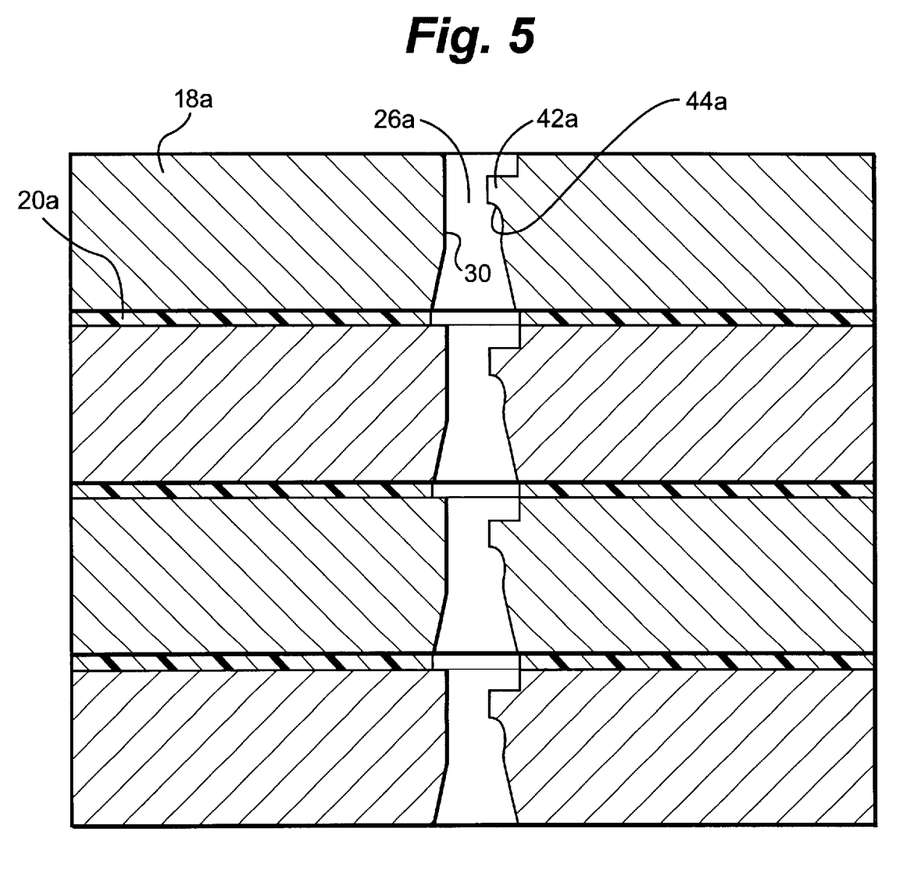
FIG. 5 is an enlarged cross-sectional view of a plurality of stacked rotor turns illustrating the turbulated passages therethrough according to a first embodiment of the present invention.
Figure 6:
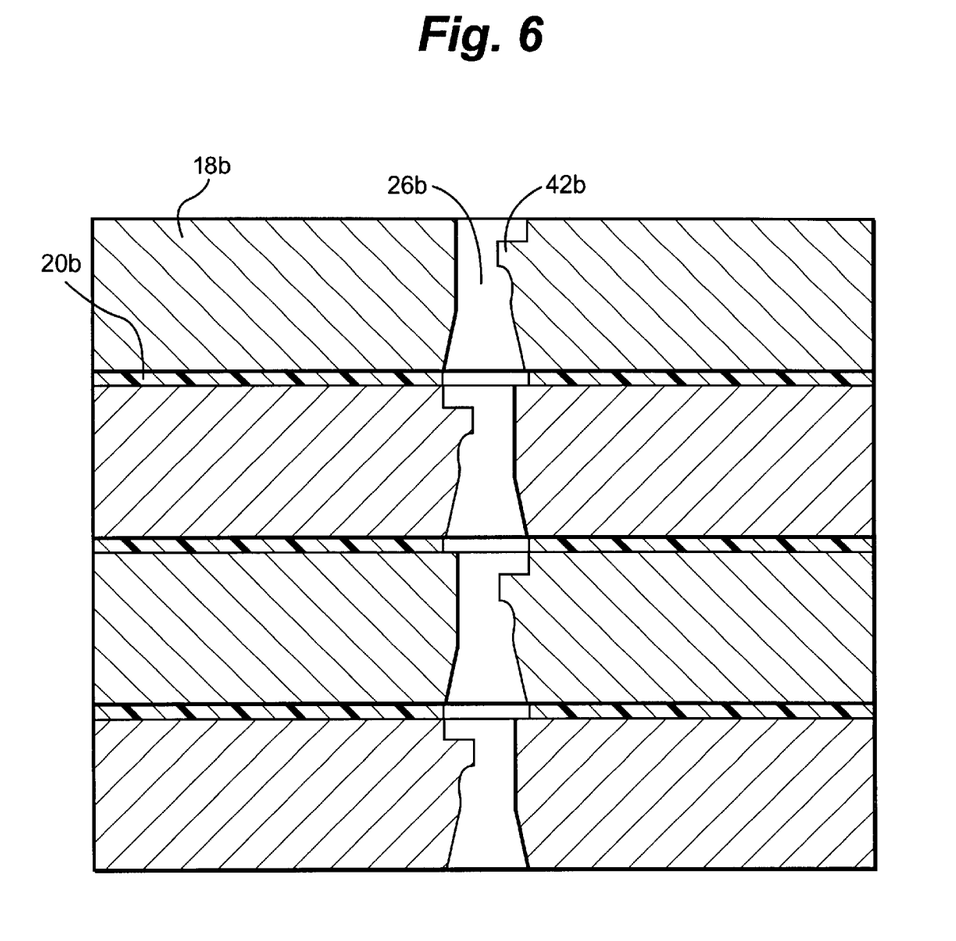
FIG. 6 is a view similar to FIG. 5 illustrating a second embodiment of the present invention.

In the arrangement of the turns 18a illustrated in FIG. 5, it will be seen that the protuberances 42a are aligned along a common side of the wall surfaces of the turns defining the openings 26a and in opposition to relatively smooth wall surfaces 30 along the opposite side of the openings 26a. Referring to FIG. 6 wherein like reference numerals are applied as in the preceding embodiment of FIG. 5 followed by the suffix "b," the protuberances 42b of the adjacent stacked turns 18b alternate on opposite sides of the openings 26b.

Figure 7:
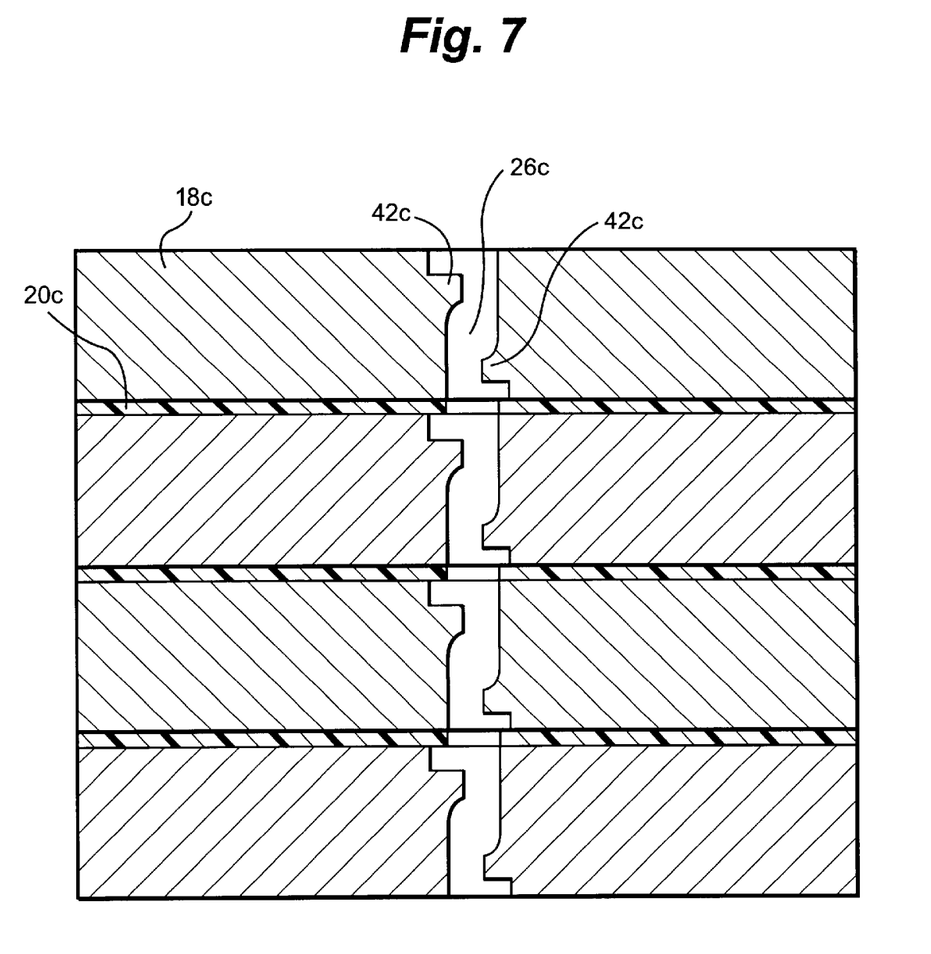
FIG. 7 is a view similar to FIG. 5 illustrating a third embodiment of the present invention.

In the arrangement of stacked turns illustrated in FIG. 7 wherein like reference numerals are applied as in the preceding embodiments of FIGS. 5 and 6 and followed by the suffix "c," the protuberances 42c are formed along opposite wall surfaces of each turn 18c to project in opposite circumferential directions. However, the protuberances 42c are spaced one from the other in a radial direction of each duct formed by the openings 26c through the stacked turns 18c. The protuberances 42c are formed by introducing the punch of FIGS. 8–10 from opposite sides of the turns.

It will be appreciated that while the turbulators 42a–c are described and illustrated with respect to openings through turns which are not of a constant cross-sectional area from top to bottom, i.e., enlargements 26' are formed where the punch results in a breakout of material over a portion of the opening, the initial opening formed by the punch may be through the entire thickness with no torn or breakout region. In this manner, an opening of constant cross-sectional area from top to bottom through each turn is formed (excluding the subsequently formed protuberance). In FIGS. 5 through 7, the direction of flow of the cooling medium is from the radially inner portion of the stacked turns from subslot 22 radially outwardly through the openings 26a–c, i.e., from the bottom of the drawing figures to the top of the drawing Figures. The cooling medium flows into a gap between the wedge 24 and the outermost turn and insulation for subsequent flow through openings in the wedge. As a consequence of the location of turbulators in the stacked openings 26a–c, the flow of the cooling medium through the openings has increased turbulence, effecting an improved rate of heat transfer within the duct, particularly by positively and actively mixing the heated medium adjacent the duct wall and the relatively cooler medium through the centerline of the duct. This also increases the surface area exposed to convective cooling gas and creates areas within the duct in the vicinity of the turbulator effecting fluid separation and reattachment for local enhancement of heat transfer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming rotor windings for a dynamoelectric machine comprising the steps of:
   punching a through opening in each turn of the rotor windings;
   coining said turn to form a protuberance in each said turn projecting into the punched opening; and
   stacking said turns in a rotor slot of the rotor of the dynamoelectric machine with said openings in registration with one another to form a flow passage.

2. A dynamoelectric machine comprising:
   a rotor having a plurality of generally radially extending slots circumferentially spaced from one another;
   windings for said machine including a plurality of radially spaced rotor turns stacked one on top of another in each of said slots;
   means for introducing a cooling medium adjacent radially inner portions of said slots;
   each stacked rotor turn having an opening in communication with a radially adjacent registering opening of an adjacent stacked turn for flowing the cooling medium from said introducing means through the registering openings in a radially outward direction;
   a protuberance carried by at least one rotor turn projecting into and transverse to the direction of flow through the opening and extending in a generally circumferential direction affording a turbulent flow of the cooling medium through the opening of the one rotor turn for positively mixing cooling medium in the opening adjacent the protuberance and cooling medium adjacent a central portion of the opening;
   each turn having opposed wall surfaces with one wall surface having said protuberance projecting toward a second opposite wall surface, said second wall surface being relatively smooth.

3. A dynamoelectric machine comprising:
   a rotor having a plurality of generally radially extending slots circumferentially spaced from one another;
   windings for said machine including a plurality of radially spaced rotor turns stacked one on top of another in each of said slots;
   means for introducing a cooling medium adjacent radially inner portions of said slots;
   each stacked rotor turn having an opening in communication with a radially adjacent registering opening of an adjacent stacked turn for flowing the cooling medium from said introducing means through the registering openings in a radially outward direction;
   a protuberance carried by at least one rotor turn projecting into and transverse to the direction of flow through the opening and extending in a generally circumferential direction affording a turbulent flow of the cooling medium through the opening of the one rotor turn for positively mixing cooling medium in the opening adjacent the protuberance and cooling medium adjacent a central portion of the opening;
   each of said turns having a protuberance projecting from a first wall surface thereof into the opening toward an opposing second wall surface thereof for mixing cooling medium in the opening adjacent the first wall and cooling medium adjacent a central portion of the opening.

4. A dynamoelectric machine comprising:
   a rotor having a plurality of generally radially extending slots circumferentially spaced from one another;
   windings for said machine including a plurality of radially spaced rotor turns stacked one on top of another in each of said slots;
   means for introducing a cooling medium adjacent radially inner portions of said slots;
   each stacked rotor turn having an opening in communication with a radially adjacent registering opening of an adjacent stacked turn for flowing the cooling medium from said introducing means through the registering openings in a radially outward direction;
   a protuberance carried by at least one rotor turn projecting into and transverse to the direction of flow through the opening and extending in a generally circumferential direction affording a turbulent flow of the cooling medium through the opening of the one rotor turn for positively mixing cooling medium in the opening adjacent the protuberance and cooling medium adjacent a central portion of the opening;

each of said turns having a protuberance projecting from a first wall surface into the opening toward an opposing second wall surface for mixing cooling medium in the opening adjacent the first wall surface carrying said protuberance and cooling medium adjacent a central portion of the opening, the protuberances in registering openings of adjacent turns lying alternately on opposite wall surface thereof so that the protuberances alternate between opposite wall surfaces of said turns.

5. A dynamoelectric machine according to claim 4 wherein the protuberances carried by said first wall surfaces lie on one side only of the registering openings through the turns.

6. A dynamoelectric machine according to claim 3 wherein each of said turns has first and second protuberances carried by opposed first and second wall surfaces, respectively, defining said opening, said protuberances lying at different elevations relative to one another in each said opening.

* * * * *

UNITED STATES PATENT AND TRADEMARK OFFICE
CERTIFICATE OF CORRECTION

PATENT NO.   : 6,362,545 B1
DATED        : March 26, 2002
INVENTOR(S)  : Prole et al.

It is certified that error appears in the above-identified patent and that said Letters Patent is hereby corrected as shown below:

Column 2,
Line 64, delete "the stacked".
Line 66, after "of", insert -- the slots, each stacked --.

Column 5,
Line 52, delete claim 1 in its entirety.

Signed and Sealed this

Twenty-ninth Day of July, 2003

JAMES E. ROGAN
*Director of the United States Patent and Trademark Office*